United States Patent [19]

Airhart

[11] Patent Number: 4,739,857

[45] Date of Patent: Apr. 26, 1988

[54] SEISMIC SOURCE USING SELF-PROPELLED PROJECTILE

[75] Inventor: Tom P. Airhart, Plano, Tex.

[73] Assignee: Atlantic Richfield Company, Los Angeles, Calif.

[21] Appl. No.: 325,394

[22] Filed: Nov. 27, 1981

[51] Int. Cl.$^4$ ............................................... G01V 1/02
[52] U.S. Cl. ............................................................ 181/113
[58] Field of Search ............... 181/106, 113, 114, 116,
181/117, 121, 401; 367/145, 146; 175/1, 2, 4;
173/128, 90, 112, 119, 84, 125, 134; 89/40 L, 8;
114/20 A; 244/3.12; 102/375; 124/57; 404/133

[56] References Cited

U.S. PATENT DOCUMENTS

| | | | |
|---|---|---|---|
| 466,056 | 12/1891 | Bott | 102/375 |
| 3,318,411 | 5/1967 | Doubt | 181/114 |
| 4,223,759 | 9/1980 | Martin | 181/114 |
| 4,247,059 | 1/1981 | Duke et al. | 244/3.12 |
| 4,284,164 | 8/1981 | Airhart | 181/117 |
| 4,284,165 | 8/1981 | Airhart et al. | 181/117 |
| 4,329,971 | 5/1982 | Kemery et al. | 89/8 |
| 4,334,591 | 6/1982 | Martin | 181/114 X |
| 4,354,572 | 10/1982 | Martin | 181/114 X |

FOREIGN PATENT DOCUMENTS

| | | | |
|---|---|---|---|
| 944472 | 3/1974 | Canada | 181/113 |
| 0748310 | 7/1980 | U.S.S.R. | |

Primary Examiner—Thomas H. Tarcza
Assistant Examiner—Ian J. Lobo
Attorney, Agent, or Firm—Robert M. Betz

[57] ABSTRACT

A man-portable, easily disassembled seismic source is described which utilizes a self-propelled projectile. The projectile, carrying a container of compressed gas, is supported over a rigid earth-contacting target at one end of a lightweight linear guide or track. When the support is removed, the container is automatically vented to atmosphere in an upward direction. In this way, the projectile is jet-propelled to the target, which in turn produces an acoustic pulse in the earth.

3 Claims, 3 Drawing Sheets

SEISMIC SOURCE USING SELF-PROPELLED PROJECTILE

FIELD OF THE INVENTION

This invention relates generally to the field of acoustic impulse generators and more particularly, seismic sources. Still more particularly, the invention is concerned with the devices of this character employing a self-propelled impact mass or projectile.

DESCRIPTION OF THE PRIOR ART

The closest pertinent art to this invention known to the Applicant appears to lie in those fields in which self-propelled vehicles or projectiles are employed in fields remote from seismic exploration. For example, a shoulder-fired military artillery device known as a rocket launcher or bazooka is used to launch an armor piercing rocket. As used herein, the term "rocket" means any of various, generally cylindrical, devices containing a combustible substance which, when ignited, produces gases escaping through a rear vent which drive the container forward by the principal of action and reaction. It is also of course well known that more complex rockets containing their own source of oxygen as well as fuel are used to propel space craft and direct them toward a desired target. To Applicant's knowledge, however, such devices have never been employed in the generation of acoustic signals. It is believed that the prior art has not appreciated the advantage of utilizing the self-propulsion principle in accelerating relatively small masses over a short distance, particularly in conjunction with a rigid ground-contacting target such as is preferable in impulse type seismic sources.

The prior art is of course replete with examples of seismic sources wherein an impact projectile is accelerated against an earth contacting target which injects an acoustic pulse into the earth. In U.S. Pat. No. 4,284,164 issued Aug. 18, 1981 to Tom P. Airhart, there is described a device of that character wherein compressed air is used to accelerate an impact mass downwardly to a target while simultaneously being vented in an upward direction to atmosphere. In this patent, the action and reaction principle is used to stabilize the generator housing so that essentially no net recoil forces are exerted upon it by the firing of the impact mass or projectile. The moving mass itself of course contains no energy source, but is rather entirely passive.

Devices of the character described, to the extent they have been utilized as seismic sources, typically require transport by and deployment from a truck or other prime mover. This necessarily imposes limitations upon the operating site for the source. That is to say, if the terrain in the area of interest makes it inaccessible by truck, apparatus which is sufficiently light in weight and maneuverable to enable several men to carry it disassembled over reasonable distances and mount it for use is essential.

It is therefore a general object of this invention to provide an improved lightweight seismic source capable of being transported by manpower alone.

It is a more particular object of this invention to provide a seismic source of the character described which is easily assembled, disassembled and deployed and which is substantially recoilless.

SUMMARY OF THE INVENTION

An impulsive type seismic source is described in which an impact projectile is accelerated along a linear guide or track by self-contained compressed gas which escapes rearwardly through a nozzle so as to provide jet propulsion. The guide is stabilized over a rigid earth contacting target in an upright position by an adjustable tripod or other similar arrangement. In a preferred embodiment, the projectile is latched at one end of the guide so that the nozzle fits over a tapered plug valve fired to the guide. When the latching means is activated by an electrical or manual firing signal, the projectile drops away from the plug valve to initiate its jet propulsion toward the target.

DESCRIPTION OF THE PREFERRED EMBODIMENTS

Figure 1:
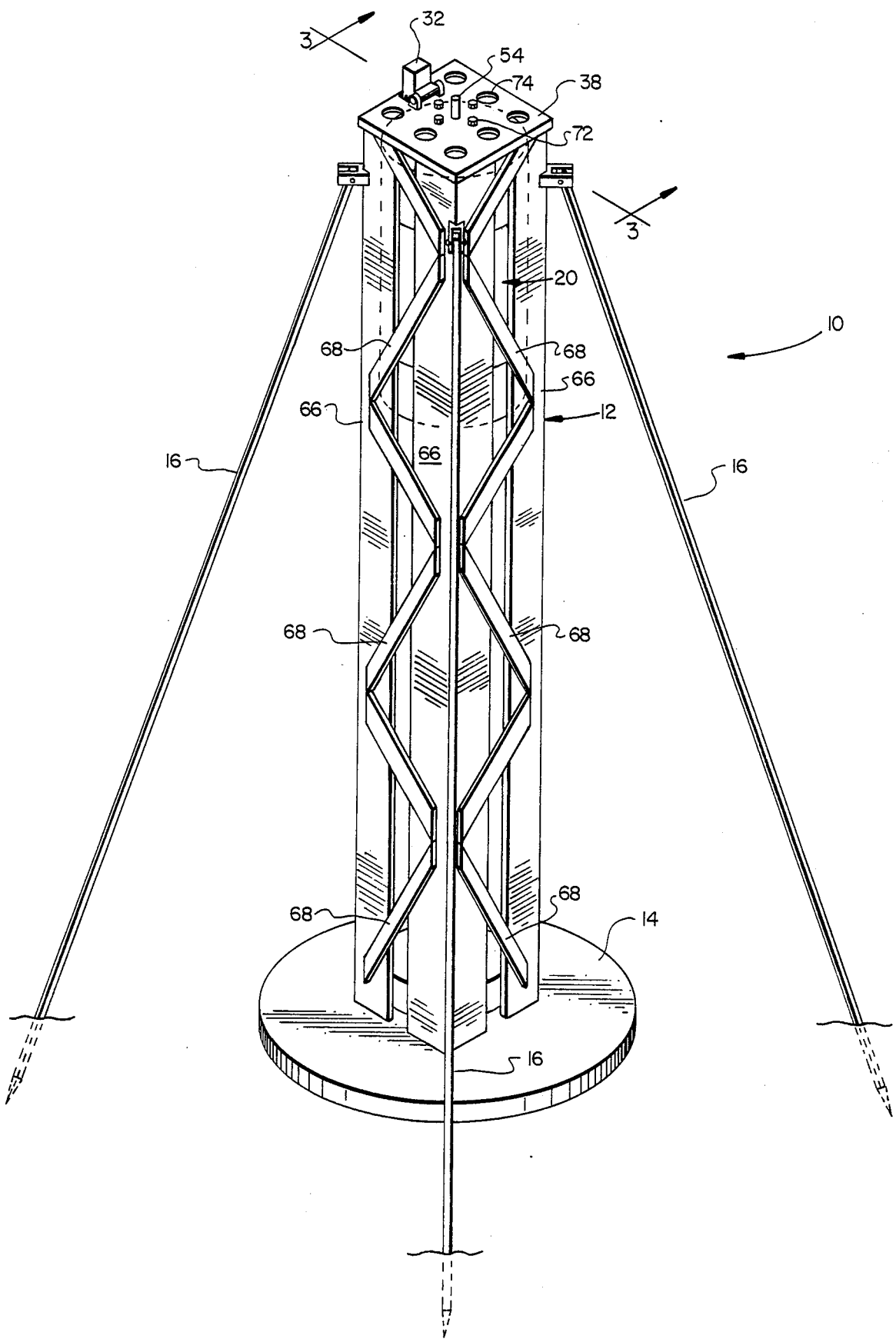
FIG. 1 is an elevational view of a seismic source in accordance with this invention.

Referring now to FIG. 1, there is illustrated a man-portable seismic source 10 in accordance with the preferred embodiment of this invention. A linear guide means 12 is supported in an upright position over and separably from a freely movable rigid earth-contacting target 14 by suitable support means such as pivotable rigid tripod supports 16, whose upper ends are attached to the guide means 12, their lower ends being pointed so they may be forced into the earth. A projectile 20 (shown in dotted outline) is supported upwardly in a firing position within linear guide 12 by latching means to be described.

Figure 2:
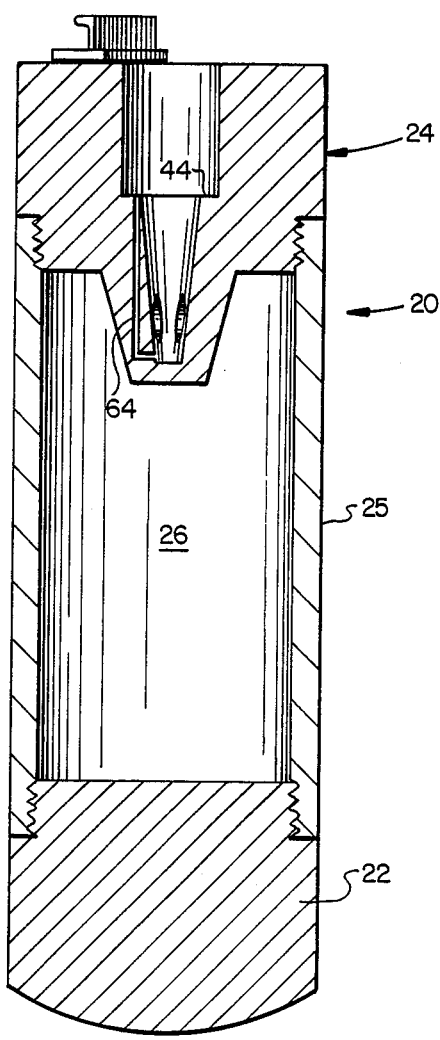
FIG. 2 is a detail in vertical section of a projectile in accordance with this invention.

As best seen in FIG. 2, the projectile 20 consists generally of a lower impact mass 22 and an upper female valve body 24 separated by a container 25 of compressed gas 26. Mass 22 and female valve member 24 are of equal diameter to that of container 25 and are threadably joined therewith at its opposite ends.

Figure 3:
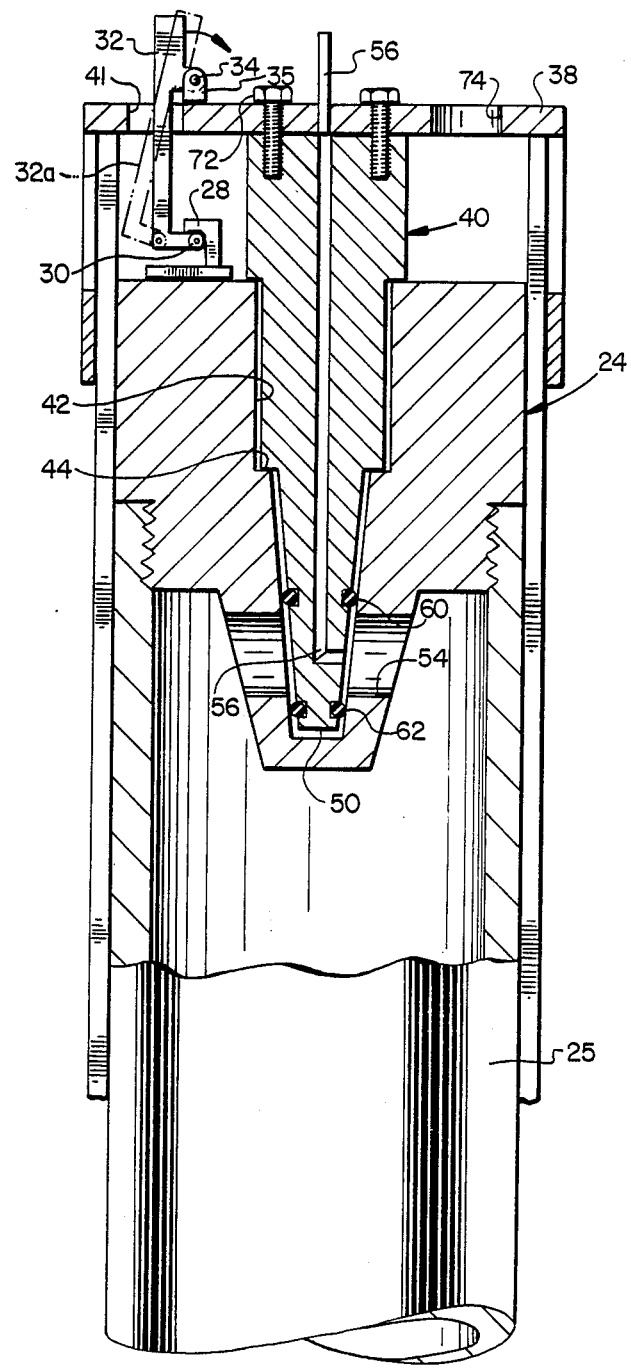
FIG. 3 is a fragmentary sectional view of the top of a linear guide means taken along the line 3—3 in FIG. 1 showing the manner of support of a self-propelled projectile therein in accordance with this invention.

In the latched position of projectile 20, as best seen in FIG. 3, detent 28 fixed to the top of valve member 24 engages mating roller 30 mounted at the lower end of pivot arm 32, which is rotatable about pivot 34 carried by pivot supports 35 on the top surface of cover plate 38. Pivot arm 32 extends through aperture 41 in cover plate 38 which accomodates limited rotation thereof.

Bolted to and depending from cover plate 38 is tapered plug valve 40, which is adapted to fit within the bore 42 of valve member 24 so that it bears against shoulder 44. The lower tip 50 of valve 40 extends adjacent the lower end of bore 42 to enable registration between side ports 54 in valve member 24 and fill channel 56 extending from the upper end of plug valve 40 and exiting adjacent the lower end thereof. In order to supply compressed gas 26 to container 25, a suitable source is connected to fill channel 56 through a one-way valve which causes gas flow through ports 54. O-ring seals 60 are provided on the external tapered surface of plug valve 40 above and below ports 54 to ensure that no pressure leakage occurs. In the unlikely event that pressure buildup occurs within bore 42 beneath valve tip 50, air pressure relief is provided by means of a channel 64 extending through valve member 24 between the base of bore 42 and shoulder 44, as best seen in the detail of FIG. 2.

Figure 4:
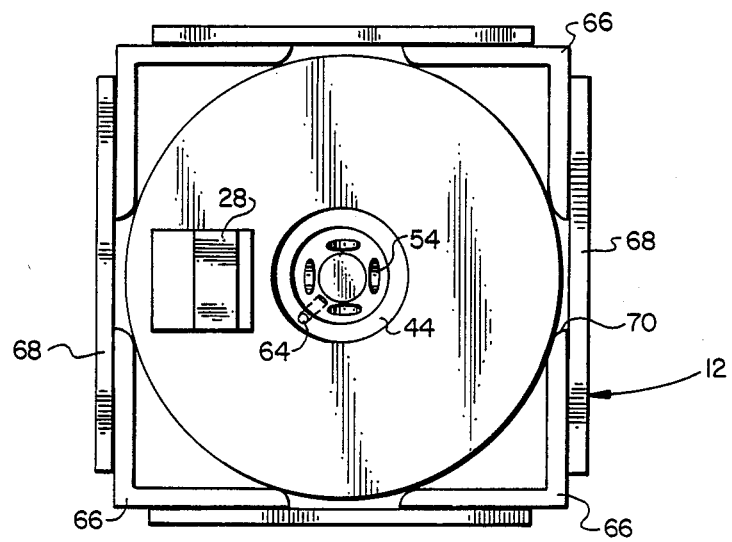
FIG. 4 is a view in plan of the top of the impact projectile within the linear guide means of FIG. 1 in accordance with this invention.
Figure 5:
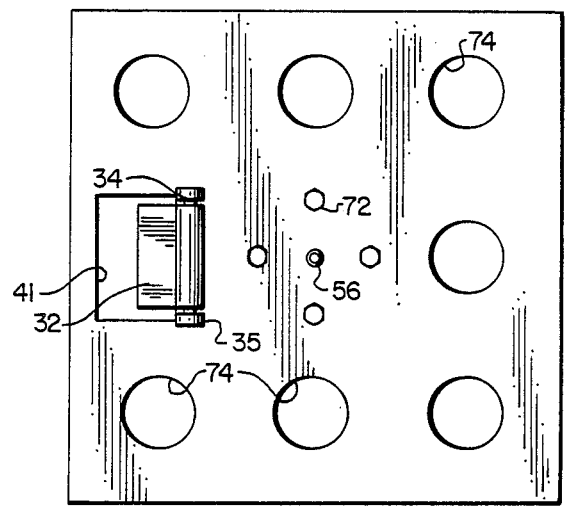
FIG. 5 is a plan view of the top cover plate of the linear guide means of the seismic source of FIG. 1 in accordance with this invention.

As seen in the plan view of FIG. 4, projectile 20 is designed to slide easily within a rectangular guide 12 comprising 4 L-shaped vertically extending stringers 66 held together by a plurality of diagonal support arms 68. The exposed vertical edges 70 of stringers 66 are rounded off at the point of contact with the surface of projectile 20 to provide substantially friction-free travel. All structural elements of linear guide 12 can be formed of lightweight aluminum for ease of portability.

Cover plate 38 of guide 12 supports plug valve 40 through a series of bolts 72. In order to provide an escape path for gases vented from container 25, a plurality of holes 74 are drilled through cover plate 38 in a symmetrical pattern.

In operation, unlatching pressure is supplied laterally against pivot arm 32 from a suitable source (not shown) causing it to rotate clockwise to a dotted position 32a, thus releasing detent 28 and automatically initiating a firing sequence. The weight of projectile 20, coupled with the force of compressed gas upwardly against the tapered surface of plug valve 40, drives projectile 20 downward and immediately releases a jet of compressed gas upwardly through the bore of valve member 24, convenient escape being provided through holes 74. Projectile 20 thus becomes jet propelled and is accelerated rapidly towards impact with target 14 to produce an acoustic pulse of interest. When projectile 20 is slid or lifted to its original position, detent 28 may be made to latch automatically against the counterforce of a return spring (not shown) connected to the upper end of pivot arm 32.

Since this device is intended to be transported to its ultimate location by manpower alone, it is convenient to this purpose that the three major components of projectile 20 are designed to be quickly assembled and disassembled for separate movement. In a practical device, the entire projectile 20 may weigh 100–150 lbs. and the linear guide means 12 on the order of 20 lbs. The target plate 14 can easily be made to disassemble into at least two pieces, each weighing not more than 10 or 15 lbs. The tripod supports 16 can also be relatively light in weight, thus transport of the entire source 10 is a task within the capability of four men without difficulty.

In deployment of the source 10, the supports 16 are spread apart at a convenient angle, their sharpened tips being pushed into the earth to a depth sufficient to support source 10 in an upright firing position as shown in FIG. 1.

This device has been described as an embodiment of the invention in which compressed gas is used as the propulsion means. Obviously, within the scope of this invention, jet propulsion could be achieved by the ignition of a solid propellant carried within projectile 20. Other energy sources utilizing a jet propulsion principle which are adapted for inclusion within projectile 20 are all included within the scope of the invention. As a further modification, the linear guide means may be replaced by a continuous walled cylindrical housing.

What has been described is only illustrative of the apparatus of this invention. Those skilled in this art will have no difficulty in making many other modifications of the component features thereof without departing from the scope of this invention as more particularly set forth in the appended claims.

I claim:

1. An impulsive type seismic source comprising:
   (a) an impact projectile;
   (b) an elongated linear guide means along which said projectile is constrained to travel;
   (c) means for supporting said guide means in an upright position;
   (d) means for supporting said impact projectile adjacent the upper end of said guide means in a firing position;
   (e) a container for compressed gas within said projectile
   (f) means for supplying said container with a charge of compressed air in said firing position;
   (g) means for disengaging said projectile from said support means; and
   (h) means responsive to said disengagement for venting said compressed gas upwardly, thereby causing said projectile to be downwardly propelled to strike a target positioned adjacent the lower end of said guide means.

2. Apparatus as in claim 1 including a nozzle positioned at the upper end of said container through which said vented gas is adapted to be expelled to increase its velocity.

3. Apparatus as in claim 2 wherein said projectile additionally comprises an impact mass to which said container for compressed gas is detachably joined.

* * * * *